United States Patent [19]
Cook et al.

[11] Patent Number: 5,300,590
[45] Date of Patent: Apr. 5, 1994

[54] MACROCYCLIC POLYESTER COMPOSITIONS CONVERTIBLE TO LINEAR POLYESTERS OF IMPROVED INTEGRITY

[75] Inventors: Todd D. Cook, Hilliard, Ohio; Thomas L. Evans, Clifton Park, N.Y.; Kevin P. McAlea, Clifton Park, N.Y.; Eric J. Pearce, Clifton Park, N.Y.

[73] Assignee: General Electric Company, Schenectady, N.Y.

[21] Appl. No.: 983,200

[22] Filed: Nov. 30, 1992

[51] Int. Cl.$^5$ ............................................. C08F 20/00
[52] U.S. Cl. .................................... 525/444; 525/437; 524/175; 524/178
[58] Field of Search ................ 525/437, 444; 524/175, 524/178

[56] References Cited

U.S. PATENT DOCUMENTS

| | | | |
|---|---|---|---|
| 3,953,394 | 4/1976 | Fox et al. | 524/86 |
| 4,220,735 | 9/1980 | Dieck et al. | 525/90 |
| 4,565,763 | 1/1986 | Uchiyama et al. | 430/109 |
| 4,939,060 | 7/1990 | Tomiyama et al. | 430/106.6 |
| 5,039,783 | 8/1991 | Brunelle et al. | 528/272 |
| 5,135,833 | 8/1992 | Matsunaga et al. | 430/110 |
| 5,147,747 | 9/1992 | Wilson et al. | 430/109 |
| 5,156,937 | 10/1992 | Alexandrovich et al. | 430/110 |

*Primary Examiner*—Samuel A. Acquah
*Attorney, Agent, or Firm*—William H. Pittman

[57] ABSTRACT

The crystallinity of polyesters prepared from macrocyclic poly(1,4-butylene terephthalate) oligomers is reduced and cracking of molded parts suppressed by the incorporation therein of at least one other linear or macrocyclic poly(alkylene dicarboxylate) oligomer, such as poly(ethylene terephthalate) or poly(1,4-butylene isophthalate). It is preferably employed in macrocyclic form. The resulting compositions can be combined with inert fillers and polymerized.

20 Claims, No Drawings

MACROCYCLIC POLYESTER COMPOSITIONS CONVERTIBLE TO LINEAR POLYESTERS OF IMPROVED INTEGRITY

This invention relates to the preparation of linear polyesters from macrocyclic polyester oligomers. More particularly, it relates to the preparation of polyester articles of improved integrity.

Macrocyclic poly(alkylene dicarboxylate) oligomers are a promising genus of intermediates for linear polyester formation. By "macrocyclic" is meant that the oligomers have an overall cyclic configuration, independent of any alicyclic or aromatic rings present in the structural units thereof. The preparation of mixtures of such oligomers is described in U.S. Pat. No. 5,039,783, which also discloses methods for their conversion to linear polyesters by catalyzed ring-opening polymerization.

Among the most promising members of this genus are the macrocyclic poly(1,4-butylene terephthalate) oligomers. It is well known that the corresponding linear polyester, hereinafter sometimes designated "PBT", has a very high degree of crystallinity and crystallizes rapidly from the melt. It is, therefore, in wide use as a solvent-and abrasion-resistant engineering resin with high surface hardness and high gloss.

Copending, commonly owned application Ser. No. 07/702,577 describes in detail the conversion of macrocyclic polyester oligomers to linear polyesters. It discloses the fact that some of the oligomer species are capable of isothermal polymerization; that is, they can be polymerized at temperatures above their melting point but below the crystalline melting temperature of the linear polyester, whereupon crystallization occurs immediately upon polymer formation. Copending, commonly owned application Ser. No. 07/700,839, now U.S. Pat. No. 5,191,013, describes the preparation of macrocyclic oligomer "prepregs" containing reinforcing materials such as glass fibers, which may be polymerized and simultaneously molded to form composite articles with excellent properties.

Among the properties ancillary to the high degree of crystallinity of PBT is a high heat of melting. For conventionally prepared PBT, this parameter generally falls within the range of about 40–55 joules per gram (J/g). It has been found, however, that PBT prepared from macrocyclic oligomers can have a substantially higher heat of melting. Values in the range of 60–65 J/g are common when isothermal polymerization is not employed. When it is employed, values as high as 80 J/g have been observed.

Thus, it appears that PBT prepared from macrocyclic oligomers has an even higher degree of crystallinity than PBT prepared by other methods. This is substantiated by the finding that PBT so prepared has a volume fraction of crystals as much as two times that of conventionally prepared PBT.

This higher level of crystallinity has been found to create a problem in the molding of parts, particularly composite parts containing fibrous reinforcement. Such parts are susceptible to internal cracking, and the cracks can have a deleterious effect on the properties of the molded parts. For example, the flexural strength of such parts may be lower than desired, and the parts have an undesirable tendency to absorb solvent by reason of the cracks therein.

It is of interest, therefore, to reduce the crystallinity of PBT prepared from macrocyclic oligomers sufficiently to suppress cracking. However, relatively high crystallinity is still an important property since it contributes to many of the desirable properties of the polyester, especially solvent resistance.

The present invention is based on the discovery that the crystallinity of PBT prepared from macrocyclic oligomers can be decreased in a predictable manner by incorporating a second poly(alkylene dicarboxylate) in the macrocyclic oligomers, either in linear or in macrocyclic form. As a result, cracking is suppressed and the properties of the linear polyester are frequently improved.

Therefore, the invention includes compositions comprising (A) at least one macrocyclic poly(1,4-butylene terephthalate) oligomer in combination with (B) at least one macrocyclic or linear second poly(alkylene dicarboxylate), reagent B being present in an amount effective to reduce the heat of melting of the composition to a value no higher than 60 J/g.

Reagent A in the compositions of this invention is at least one macrocyclic poly(1,4-butylene terephthalate) oligomer. It is usually a mixture of oligomers having different degrees of polymerization, of the type disclosed in the aforementioned U.S. Pat. No. 5,039,783.

Reagent B is at least one macrocyclic or linear second poly(alkylene dicarboxylate), which may be homopolymeric or copolymeric. It typically contains structural units of the formula

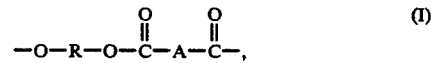

wherein each R is independently an alkylene or mono- or polyoxyalkylene radical containing a straight chain of about 2–8 atoms and each A is independently an m- or p-linked monocyclic aromatic or alicyclic radical, with the proviso that R is not 1,4-butylene when A is p-phenylene.

Illustrative values of R are ethylene, propylene, tetramethylene, hexamethylene, neopentylene and the polyoxyalkylene radicals derived from diethylene glycol and triethylene glycol. Illustrative A values are m- and p-phenylene. Particularly preferred as reagent B are materials in which each R is ethylene and each A is p-phenylene, and in which each R is 1,4-butylene and each A is m-phenylene; that is, poly(ethylene terephthalate) ("PET") and poly(1,4-butylene isophthalate) ("PBI").

Reagent B may be a linear polyester. However, linear polyesters are often not preferred since they may increase the viscosity of the macrocyclic PBT oligomers to an undesirable level. Preferably, reagent B is also at least one macrocyclic oligomer and especially a mixture of such oligomers having different degrees of polymerization.

The compositions of this invention also preferably contain a macrocyclic polyester oligomer polymerization catalyst. Such catalysts include basic reagents, tin alkoxides, organotin compounds (i.e., compounds containing a Sn—C bond), titanate esters and metal acetylacetonates.

Suitable basic reagents include alkali metal salicylates, alkali metal alkoxides and phosphines. Illustrative salicylates are lithium salicylate, sodium salicylate and potassium salicylate, with lithium salicylate generally being preferred. Illustrative alkoxides are the sodium and potassium $C_{1-4}$ alkoxides. Illustrative phosphines include triphenylphosphine and substituted triphenylphosphines, particularly those containing electron-donating substituents such as tris(p-methoxyphenyl)-phosphine.

Illustrative tin alkoxides are those containing $C_{1-4}$ alkyl groups; they include stannous methoxide, ethoxide and propoxides. Illustrative organotin compounds are dialkyltin(IV) oxides such as di-n-butyltin(IV) oxide and di-n-octyltin(IV) oxide, as well as dialkyltin(IV) dialkoxides such as di-n-butyltin(IV) di-n-butoxide and heterocyclic analogs thereof such as 2,2-di-n-butyl-2-stanna-1,3-dioxacycloheptane and 1,1,6,6-tetra-n-butyl-1,6-distanna-2,5,7,10-tetraoxacyclodecane. Illustrative titanate esters are isopropyl titanate and 2-ethylhexyl titanate.

The metal acetylacetonates are illustrated by ferric acetylacetonate and cobalt(III) acetylacetonate. They are often advantageously employed in two-component catalyst systems in combination with an aliphatic alcohol, especially a diol such as 1,12-dodecanediol. The metal acetylacetonate and alcohol are generally employed in approximately equimolar proportions. Such two-component catalyst systems may be advantageous in situations where close control of the time of polymerization is necessary.

The compositions of this invention also usually contain inert fillers. Suitable fillers include particulate materials such as clay, talc, quartz, wood flour, finely divided carbon and silica. Fillers comprising continuous or chopped fibers, including fibrous carbon, glass, boron and fibrous polymers such as poly(butylene terephthalate) and highly oriented polyamide, are particularly useful. Carbon and glass fibers are frequently preferred, with carbon fibers being advantageous when a particularly stiff composite article is desired. Continuous fillers may be in unidirectional form, either as yarns or as random fiber, or may be woven into fabric batts or tapes.

Reagent B is present in the compositions of this invention in an amount effective to reduce the heat of melting of the composition to a value no higher than 60 J/g. The required amount can be easily determined without undue experimentation. In general, it is about 8–30 mole percent based on total structural units. About 10–25 mole percent is frequently preferred.

The proportions of filler and catalyst are subject to wide variation. In general, said compositions will contain about 20–80% macrocyclic oligomer composition and linear polyester (if any) by weight, based on total composition, with the remainder being filler. Also contemplated are preforms having much lower proportions of oligomers, typically as low as 5%. The proportion of catalyst is typically about 0.01–2.0 and preferably about 0.05–1.0 mole percent based on structural units in the oligomers.

Considerable variation is also possible in the form in which the macrocyclic oligomers are combined with filler. It is, of course, contemplated to form a "prepreg" (i.e., a filler-impregnated composition capable of being handled and of conversion to a resinous composite) by impregnating the filler with liquid macrocyclic oligomers and solidifying the latter, forming a consolidated layer which may be stacked with other similar layers to form a moldable article. Also contemplated is the combination of filler with unconsolidated solid macrocyclic oligomers, typically in finely powdered form; articles thus produced are similar or identical to preforms of the type known to those skilled in the art.

A blending option of particular value with the compositions of this invention is the combination of filler with liquid macrocyclic oligomer, typically in a mold. This is possible because of the extremely low melt viscosities of the macrocyclic oligomer compositions, about 0.07 poise at 250° C. for a typical PBT macrocyclic oligomer mixture. Because of this low melt viscosity, it is frequently unnecessary to impregnate the fibers prior to placing them in the mold.

The compositions of this invention may be converted to thermoplastic poly(alkylene dicarboxylates), including composites thereof, by heating to polymerize the macrocyclic polyester oligomers. Polymerization temperatures are typically in the range of about 165°–300° C.

As will be apparent from the description hereinabove, the compositions of this invention may be employed in a wide variety of ways to make molded thermoplastic composite articles. Suitable methods of composite formation combined with molding or other types of shaping include resin transfer molding, pultrusion, injection molding, autoclave molding and compression molding.

Because of the relatively low viscosities of the macrocyclic polyester oligomers at molding temperatures, it may be preferable to employ a matched die type of mold. The surfaces of the mold may be coated with a suitable mold release agent, typically a silicone material, before charging with the oligomer composition. Upon polymerization, the compositions of this invention are converted to fiber-reinforced polyester articles which have the excellent properties characteristic of poly(alkylene dicarboxylates), including solvent resistance.

The preparation and polymerization of the compositions of this invention is illustrated by the following example. All parts and percentages are by weight unless otherwise indicated. Weight average molecular weights were determined by gel permeation chromatography relative to polystyrene.

EXAMPLE 1

Blends of macrocyclic PBT and PET or PBI oligomer mixtures containing a polymerization catalyst were prepared by codissolving both mixtures in methylene chloride and adding 0.5 mole percent, based on structural units in the oligomers, of 1,1,6,6-tetra-n-butyl-1,6-distana-2,5,7,10-tetraoxacyclodecane. The solvent was evaporated and the resulting powders were vacuum dried overnight at 60° C.

Differential scanning calorimetry experiments were performed on approximately 20-mg. samples of the mixed cyclic oligomers to determine the effect of blend composition on heat of melting. The samples were sealed in aluminum pans and rapidly heated to 190° C., held at that temperature for 10 minutes to complete polymerization, cooled at 20° C. per minute to −30° C. and scanned (twice in the case of the PET blends and once for the PBI blends). The results are given in the following table; for the PBT-PET blends, the figures given are averages of the values for two runs, and for neat PBT they are the average of three runs. "Tm" represents the onset of melting.

| Component B (mole %) | Tg, °C. | Tm, °C. | Heat of melting, J/g | Mw |
|---|---|---|---|---|
| None | 46 | 215 | 72 | 80,000 |
| PET(8) | 35 | 199 | 57 | 86,000 |

-continued

| Component B (mole %) | Tg, °C. | Tm, °C. | Heat of melting, J/g | Mw |
|---|---|---|---|---|
| PET(17) | 37 | 191 | 52 | 62,000 |
| PET(25) | 49 | 189 | 42 | 67,000 |
| PBI(5) | 43 | 209 | 70 | — |
| PBI(10) | 36 | 200 | 50 | — |
| PBI(20) | 30 | 194 | 50 | — |
| PBI(40) | 26 | 120 | 23 | — |

It is apparent from the values in the table that a decrease in the heat of melting to a maximum value of 60 J/g is observed when reagent B is present in an amount greater than 8 mole percent. Values in a particularly advantageous range are noted at levels from 8 to 25 mole percent.

EXAMPLE 2

In each of several runs, a matched die mold was charged with 9.2 grams of macrocyclic polyester oligomers. 13 layers of 8-harness satin weave E-glass with an epoxy-functional silane finish, cut to 24.1×14.0 cm., were then placed in the mold with 4.6 grams of oligomers between every two layers. Finally, 9.2 grams of oligomers were placed on the top glass fiber layer, and the mold was dried overnight under vacuum at 80° C.

The mold was placed in a preheated press, heated to about 200° C. at a pressure of 7 kg./cm.$^2$, held at 200° C. for about 5 minutes and cooled to 170° C.; it was then removed from the press and the part was demolded. The flexural strengths of the composites and the molecular weights of the polymers were determined, and polished cross-sections were examined for matrix cracking. Parts were then immersed for 300 hours in a mixture of 15% (by volume) gasoline and 85% methanol and similarly tested.

A first series of molded parts was found to have polyester molecular weights in the range of 80,000-120,000, similar to those of typical commercial polyesters (about 60,000-125,000). The pure PBT parts were found to have extensive cracking in the resin-rich regions. On the other hand, parts prepared from a blend containing 10 mole percent PET or PBI were found to have little if any cracking.

A second set of molded parts had molecular weights in the range of about 150,000-300,000. The flexural strength of the PBT part in this molecular weight range was on the order of 390 MPa., while that of a part containing 10 mole percent PET was on the order of 360 MPa. However, after saturation with the solvent mixture the PBT part had a flexural strength of 276 MPa. and considerable cracking was evident, while the PET-containing part had a flexural strength of 324 MPa. and showed little cracking. Moreover, the PBT part absorbed 0.7% of the solvent at saturation, as compared to 0.4% for the PET-containing part. This improvement in solvent resistance is highly unexpected in view of the decreased crystallinity (as shown in Example 1) of PET-containing parts.

What is claimed is:

1. A composition comprising (A) at least one macrocyclic poly(1,4-butylene terephthalate) oligomer in combination with (B) at least one macrocyclic or linear second poly(alkylene dicarboxylate), reagent B being present in an amount effective to reduce the heat of melting of a linear polyester composition formed by polymerization of said macrocyclic oligomers to a value no higher than 60 J/g.

2. A composition according to claim 1 wherein reagent B is a linear polyester.

3. A composition according to claim 2 wherein reagent B is poly(ethylene terephthalate).

4. A composition according to claim 2 wherein reagent B is poly(1,4-butylene isophthalate).

5. A composition according to claim 1 wherein reagent B is at least one macrocyclic oligomer.

6. A composition according to claim 5 wherein reagent B is poly(ethylene terephthalate).

7. A composition according to claim 5 wherein reagent B is poly(1,4-butylene isophthalate).

8. A composition according to claim 5 wherein the amount of reagent B is about 8-30 mole percent based on total structural units.

9. A composition according to claim 1 which further contains a macrocyclic polyester oligomer polymerization catalyst.

10. A composition comprising (A) at least one macrocyclic poly(1,4-butylene terephthalate) oligomer, (B) at least one macrocyclic or linear second poly(alkylene dicarboxylate) in an amount effective to reduce the heat of melting of a linear polyester composition formed by polymerization of said macrocyclic oligomers to a value no higher than 60 J/g, a macrocyclic polyester oligomer polymerization catalyst and an inert filler.

11. A composition according to claim 10 wherein the filler comprises continuous or chopped fibers.

12. A composition according to claim 10 wherein reagent B is a linear polyester.

13. A composition according to claim 12 wherein reagent B is poly(ethylene terephthalate).

14. A composition according to claim 12 wherein reagent B is poly(1,4-butylene isophthalate).

15. A composition according to claim 10 wherein reagent B is at least one macrocyclic oligomer.

16. A composition according to claim 15 wherein reagent B is poly(ethylene terephthalate).

17. A composition according to claim 15 wherein reagent B is poly(1,4-butylene isophthalate).

18. A composition according to claim 15 wherein the amount of reagent B is about 8-30 mole percent based on total structural units.

19. A composition according to claim 10 wherein the proportion of catalyst is about 0.05-1.0 mole percent based on structural units in the oligomers.

20. A composition according to claim 10 wherein the proportion of macrocyclic oligomers and linear polyester, when present is about 20-80% based on total composition.

* * * * *